(12) United States Patent
Pojar

(10) Patent No.: US 6,285,814 B1
(45) Date of Patent: Sep. 4, 2001

(54) LIGHT GUIDE LUMINAIRE

(75) Inventor: Stephen J. Pojar, Marine-on-the-St. Croix, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/409,757

(22) Filed: Sep. 30, 1999

(51) Int. Cl.$^7$ ........................................ G02B 6/00
(52) U.S. Cl. ............................. 385/133; 385/901
(58) Field of Search ...................... 385/901, 146, 385/147, 37

(56) References Cited

U.S. PATENT DOCUMENTS

| | | | |
|---|---|---|---|
| 4,260,220 | 4/1981 | Whitehead | 350/96.28 |
| 4,615,579 | 10/1986 | Whitehead | 350/96.1 |
| 4,787,708 | 11/1988 | Whitehead | 350/96.28 |
| 4,805,984 | 2/1989 | Cobb, Jr. | 350/96.28 |
| 4,906,070 | 3/1990 | Cobb, Jr. | 350/286 |
| 5,056,892 | 10/1991 | Cobb, Jr. | 359/831 |
| 5,339,382 | 8/1994 | Whitehead | 385/146 |
| 5,384,881 * | 1/1995 | Miller | 385/115 |
| 5,486,984 * | 1/1996 | Miller | 362/32 |
| 5,661,839 | 8/1997 | Whitehead | 385/131 |
| 5,715,347 | 2/1998 | Whitehead | 385/133 |
| 5,745,632 | 4/1998 | Dreyer | 385/133 |
| 5,901,266 | 5/1999 | Whitehead | 385/133 |

FOREIGN PATENT DOCUMENTS

| | | |
|---|---|---|
| 196 40 324 A1 | 3/1998 | (DE) . |
| 0 235 447 A2 | 9/1987 | (EP) . |
| WO 96/10761 | 4/1996 | (WO) . |

* cited by examiner

Primary Examiner—Scott J. Sugarman
Assistant Examiner—John J. Magee
(74) Attorney, Agent, or Firm—David B. Patchett

(57) ABSTRACT

A light guide luminaire includes a longitudinal housing having a center and an inner surface, and a light guide formed of at least two sections of optical lighting film arranged within the housing such that the shortest distance between the center of the housing and the inner surface of the housing is smaller than the radius of curvature of each section of optical lighting film. The light guide is slidably retained within the housing, and the housing and optical lighting film are arranged to define air gaps between the housing and optical lighting film. The luminaire may also include an extractor element extending radially inwardly from the inner surface of the housing for scattering light, and a back reflector for reflecting light back into the light guide. A joint member adapted to slidably receive end portions of the optical lighting film sections, the back reflector sections, and an extractor element is also disclosed.

17 Claims, 1 Drawing Sheet

LIGHT GUIDE LUMINAIRE

FIELD OF THE INVENTION

The present invention relates to a prism light guide luminaire. More particularly, the present invention relates to a prism light guide luminaire which can be constructed with a smaller radius than the minimum radius of curvature of a light guide constructed from a single sheet of optical lighting film, and includes air gaps which prevent condensation from forming in the light guide and allow individual luminaire components to be easily slid in and/or out of the luminaire housing without damaging the optical lighting film.

BACKGROUND OF THE INVENTION

The illumination of a large area by a central lighting system has long been desired because of its many advantages. For example, a centralized light source is easier to maintain than many separate light sources, heat generated by a centralized light source can be easily vented from the lighted areas, whereas heat from distributed light sources is not easily vented, and a light distribution system connected to a centralized light source radiates minimal or no heat. One such system utilizes a light guide luminaire to transmit and distribute the light.

Prism light guides and light guide luminaires are known in the patented prior art. The Whitehead U.S. Pat. No. 4,260,220, for example, discloses a hollow longitudinal light guide structure made of transparent dielectric material, such as acrylic plastic or optically clear glass, for transmitting or "piping" light from a central source to a remote location. The light guide includes substantially planar inner and outer surfaces which are in "octature." The light guide is formed of one or more longitudinal sections, each preferably having a constant cross-section along its length. The light guide can have a hollow rectangular or square cross-sectional structure made of four longitudinal wall sections bonded to form corners. The light guide can include an outer jacket or cover to protect the outer surface of the dielectric material from damage. The corners of the light guide are held in the protective jacket by corner strips and strip springs.

The Whitehead U.S. Pat. No. 4,615,579 discloses a luminaire for a prism light guide system including a light release mechanism for releasing light along the length of the light guide. The light release mechanism can be a non-planar surface, a rough outer surface, or round corners in an outer corrugated surface. The Whitehead U.S. Pat. No. 4,787,708 discloses a variety of additional techniques for continuously controlling the emission of light from a light guide such that, for example, the amount of light escaping per unit length along the light guide can be made constant to provide uniform illumination. To reflect any escaping light back into the luminaire so that it can be released through the desired surface, all of the outer surfaces through which it is not desired to have light escape can be covered by a highly reflective diffuse material such as a mirror, white paint, white plastic, white paper, or white fabric.

Light guides and light guide luminaires may be constructed with a variety of cross-sectional shapes as disclosed in U.S. Pat. No. 4,260,220 (Whitehead), U.S. Pat. No. 5,661,839 (Whitehead), U.S. Pat. No. 5,715,347 (Whitehead), and U.S. Pat. No. 4,805,984 (Cobb, Jr.). In addition, light guides can be constructed using a variety of materials such as transparent dielectric materials including acrylic plastic or optically clear glass as disclosed in U.S. Pat. No. 4,260,220 (Whitehead), or multilayer optical films as disclosed in U.S. Pat. No. 5,661,839 (Whitehead).

A typical light guide luminaire according to the prior art is depicted in FIG. 1. The luminaire 2 has a circular cross-section and includes an outer shell 4, a back reflector 6 fitted tightly against a portion of the inner surface of the shell 4, and optical lighting film 8 arranged adjacent the back reflector 6. The optical lighting film 8 is a continuous sheet of film and includes an extractor material 10 applied directly to the inner surface of the film 8 prior to assembly. Thus, the luminaire 2 includes a back reflector 6 which is tightly sandwiched between the outer shell 4 and the optical lighting film 8 with its entire inner and outer surfaces in contact therewith. The optical lighting film 8 is frictionally held in place due to the force created by bending the film and inserting it into the outer shell 4.

Conventional light guide luminaires, however, have a number of limitations and drawbacks. For example, by having the optical lighting film, back reflector, and outer shell in close contact, conventional light guide luminaires are prone to having condensation collect on the inner surface of the optical lighting film, thereby causing disruption in the light path which results in the unwanted extraction of light. In addition, having the optical lighting film, back reflector, and outer shell in close contact prevents these components from being individually slid into and/or out of the light guide luminaire without being damaged. That is, when the luminaire is constructed such that the optical lighting film, back reflector, and outer shell are in contact with one another, sliding movement among these components can cause the optical lighting film and back reflector to be scratched, thereby significantly impairing the performance of the luminaire. Accordingly, with conventional light guide luminaires, removal, replacement, or modification of the optical lighting film, back reflector, or outer shell requires complete disassembly of the luminaire.

In addition, the diameter of conventional light guide luminaires is limited depending on the flexibility of the optical lighting film used to construct the light guide. That is, certain commercially available materials with desirable optical properties presently cannot be used to construct small diameter light guide luminaires because the material is rigid and tends to crack when rolled into a cross-section having a small radius of curvature. A light guide luminaire constructed of a commercially available polycarbonate optical lighting film, for example, will begin to crack when formed into a light guide having a diameter of less than approximately four inches. As explained in U.S. Pat. No. 5,745,632 (Dreyer), an approximation for the minimum cylindrical diameter to which a particular film may be curled is determined by the equation: $D = T \times C$, where D is the diameter of the film, T is the thickness T of the film as measured from the smooth surface to the valley of the grooves, and C is a constant associated with the modulus of elasticity of the particular material.

Conventional light guide luminaire systems are typically constructed to a desired length and may be made in separate sections for handling and shipping ease. More recently, modular light guide luminaire systems have been developed utilizing a number of separate modules which are joined to form a chain as described in U.S. Pat. No. 5,901,266 (Whitehead). Each module is the same except for the extractor which must be sized to ensure the proper amount of light is emitted from each module depending on the location of the module within the chain. Since each module is constructed before it is assembled into a light distribution chain, a large inventory of modules, each having a specifically sized extractor, must be maintained to construct a light distribution system. Thus, current light guide luminaire systems must be designed for their intended end use application and once assembled, cannot be easily modified.

It would therefore be desirable to provide a light guide luminaire capable of being formed into relatively small cross-sectional configurations regardless of the material used to form the light guide. It would also be desirable to provide a light guide luminaire having air gaps between the optical lighting film guide, back reflector, and protective outer housing to prevent moisture from condensing on the optical lighting film and allow the optical lighting film, back reflector, and extractor elements to be easily slid into or out of the protective housing without damaging the components. In addition, it would be desirable to provide a light guide luminaire which can be easily modified or customized to meet particular end use applications, thereby reducing the inventory of modules needed to construct different light guide luminaire systems, and eliminating the need to separately design each light guide luminaire system based on the end use application. It would also be desirable to provide a light guide luminaire which is easy to assemble and repair, and allows each component of the luminaire to be easily replaced without damaging the optical lighting film.

SUMMARY OF THE INVENTION

The present invention provides a light guide luminaire comprising a longitudinal housing and a light guide which includes at least two longitudinally extending sections of optical lighting film arranged within the housing. The configuration and arrangement of the housing and light guide are such that the shortest distance between the center of the housing and the inner surface of the housing is smaller than the radius of curvature of each section of optical lighting film.

A section of optical lighting film, as used herein, refers to a segment of optical lighting film material having ends adjacent the luminaire housing and an intermediate portion extending between the ends which is spaced from the housing. It will be recognized, therefore, that several sections of optical lighting film may be formed from a single continuous sheet of material, or that each section may be a discrete piece of material.

The luminaire can include a longitudinally extending extractor element arranged within the light guide to scatter light, thereby causing light to be emitted from the luminaire. The extractor element can be a sheet of diffusely reflecting material secured to the inner surface of the optical lighting film or a separate component extending radially inwardly from the housing between sections of optical lighting film. The luminaire can also be provided with a back reflector arranged to reflect light back into the light guide. The back reflector can be arranged on the outer surface of the housing, on the inner surface of the housing, or in generally spaced relation between the housing and a corresponding section of optical lighting film. In addition, the housing itself may be constructed from a material that serves as a back reflector, whereby a separate back reflector is not needed.

In one embodiment, the sections of optical lighting film, back reflector sections, and extractor elements are each independently slidably retained within the housing. In addition, the housing, optical lighting film, and back reflector sections may be arranged to define gaps between the housing and back reflector sections and between the back reflector sections and the corresponding section of optical lighting film, thereby to prevent condensation from forming on the interior surface of the optical lighting film. Moreover, since the back reflector sections, optical lighting film sections, and extractor elements are independently slidably retained in the housing in spaced relation to each other, each of these components can be individually slid in or out of the housing without being damaged. This serves to facilitate the assembly of a chain of luminaire modules and reduce the inventory of modules required to construct such a chain since each module can be customized depending on its location in the chain and in accordance with the end use application.

The optical lighting film sections and back reflector section may be arcuate, whereby the bending force of each section serves to hold the section in place within the housing. In another embodiment, the luminaire includes joint members adapted to slidably receive an end portion of the optical lighting film sections, the back reflector sections, and extractor elements. In this embodiment, the joint members retain the optical lighting film sections, back reflector sections, and extractor elements in the housing. Accordingly, the optical lighting film sections and back reflector sections need not be arcuate.

Since the light guide luminaire is comprised of sections of optical lighting film, luminaires having smaller radiuses than the minimal radius of curvature of the optical lighting film can be achieved. In one embodiment, the light guide luminaire includes three sections of optical lighting film and three radially inwardly and longitudinally extending extractor elements. In a specific embodiment, each section of optical lighting film is arcuate and has a radius of curvature of about two inches and the housing is cylindrical and has a diameter of less than about two inches.

In another embodiment, an emitting panel including color, graphics, or other indicia is arranged adjacent the section of optical lighting film through which light passes. Such an emitting panel is particularly desirable for aesthetic lighting and allows the luminaire to be quickly and easily customized depending on the end use application.

BRIEF DESCRIPTION OF THE DRAWINGS

The present invention will be further described with reference to the accompanying drawings in which.

DETAILED DESCRIPTION

Figure 1:
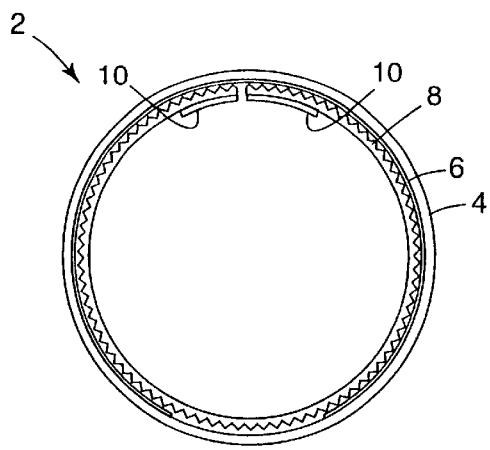
FIG. 1 is an end view of a light guide luminaire in accordance with the prior art.
Figure 2:
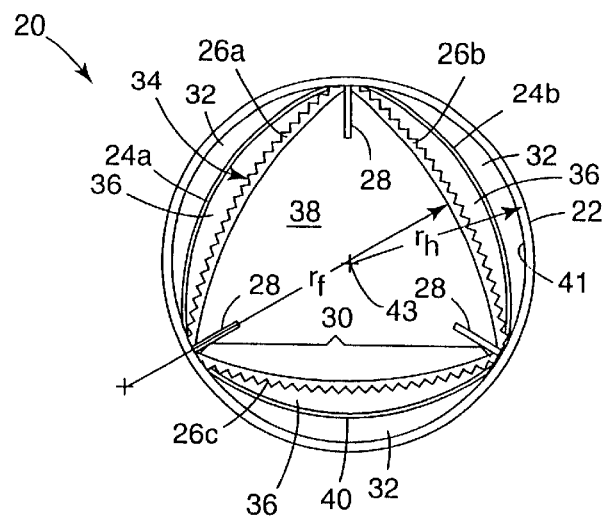
FIG. 2 is an end view of a light guide luminaire in accordance with the present invention.

Referring now to FIG. 2, there is shown a light guide luminaire 20 including a longitudinal outer housing 22, longitudinally extending arcuate sections of optical lighting film 26a–c arranged within the housing 22, longitudinally extending arcuate back reflector sections 24a, 24b arranged between the housing 22 and optical lighting film sections 26a, 26b, respectively, and longitudinally extending extractor elements 28. No back reflector section is provided between the housing 22 and optical lighting film section 26c, thereby defining an emitting area 30 through which light can escape. The luminaire 20 may optionally include an emitting panel 40 in the emitting area 30 arranged in spaced relation between optical lighting film section 26c and the inner surface of the housing 22. The emitting panel 40 can include, for example, color, printing, graphics, or other indicia.

The housing 22 is formed of a rigid material such as extruded polycarbonate and serves to protect the back reflector material 24a, 24b, optical lighting film 26a–c, and extractor elements 28 from damage due to impact or from environmental contaminants, such as dust, moisture, or insects. The housing may be constructed without a seam and is, therefore, particularly desirable for outdoor applications. The housing 22 has a hollow circular cross-sectional configuration but housings having other cross-sectional shapes, such as squares, rectangles, and ovals, can also be used.

In accordance with a characterizing feature of one embodiment of the invention, the ends of each section of optical lighting film 26a–c are adjacent the inner surface 41 of the housing 22, and the intermediate portion of each section of optical lighting film 26a–c between the ends is spaced from the inner surface 41 of the housing 22. Accordingly, the shortest distance between the center 43 of the housing 22 and the inner surface 41 of the housing 22 is smaller than the radius of curvature of each section of optical lighting film 26a–c.

The optical lighting film sections 26a–c are slidably retained within the housing 22 and combine to form a light guide 34 having a bow-shaped triangular cross-section. The light guide 34, however, need not include three sections of optical lighting film, and light guides having two, four, or more such sections are also contemplated. Each optical lighting film section 26a–c is held in place by the force created by bending the optical lighting film. Optical lighting film sections 26a, 26b are spaced from and are generally aligned with back reflector sections 24a, 24b, respectively, thereby defining gaps 36 between each back reflector section 24a, 24b and a corresponding section of optical lighting film 26a, 26b, respectively, and further defining a hollow interior space 38 through which internally reflected light is propagated. The gaps 36 and hollow interior space 38 each have a generally constant longitudinal cross-section.

Suitable materials for the optical lighting film include polycarbonates or acrylics. Other useful polymers are polypropylenes, polyurethanes, polystyrenes, polyvinyl chlorides, and the like. Polycarbonates and acrylics are of particular interest because of their high indices of refraction and physical properties, i.e., weatherability, ultraviolet resistance, dimensional stability, and temperature tolerance. A commercially available polycarbonate optical lighting film is available from Minnesota Mining and Manufacturing Company, St. Paul, Minn. under the product designation Optical Lighting Film 2301. Other suitable optical films include those discussed in U.S. Patent Nos. 4,260,220 (Whitehead); 4,906,070 (Cobb, Jr.); 5,056,892 (Cobb, Jr.); and the high efficiency specular mirror films and prismatic films discussed in U.S. Pat. No. 5,661,839 (Whitehead).

Since the luminaire is constructed using sections of the optical lighting film, luminaires having smaller radiuses than the minimal radius of curvature of the optical lighting film can be achieved. For example, as depicted in FIG. 2, if each section of optical lighting film 26a–c has a radius of curvature $r_f$ of two inches, a housing 22 having a radius of curvature $r_h$ of about one inch can be achieved, resulting in a luminaire 20 with a diameter of two inches. Conventional luminaire designs, on the other hand, often use a continuous sheet of polycarbonate optical lighting film which will begin to crack when formed into a roll having a diameter of less than four inches. In addition, providing the optical lighting film in separate sections allows different types of optical lighting film to be used in each section.

The back reflector sections 24a, 24b are spaced from the inner surface 41 of the housing 22, thereby defining gaps 32.

Each back reflector section 24a, 24b is preferably slidably retained in the housing 22 and is held in place by the force created by bending the back reflector. The back reflector sections 24a, 24b serve to reflect light propagated along the luminaire 20 back into the luminaire 20 so that light escapes only at desired locations. The back reflector may, alternatively, be provided on the outer surface of the housing 22 or may be secured to the inner surface 43 of the housing 22. In addition, for an application in which light is to be emitted from the entire luminaire 20, there is no back reflector. The back reflector 24a, 24b can be any highly diffusely reflective material. A suitable back reflector material is available from E. I. du Pont de Nemours and Company, Wilmington, Del., under the TYVEK trade designation. The back reflector can optionally include a backing to provide the back reflector with desired rigidity or stiffness properties. Also contemplated is a luminaire constructed with a back reflector which is sufficiently rigid to function as a housing, thereby eliminating the need for a separate housing.

The arcuate shape of the optical lighting film sections 26a–c and back reflector sections 24a, 24b not only serves to hold these sections in place but also more efficiently reflects light and serves to capture more light from conventional light sources which typically have a circular reflector.

The extractor elements 28 extend longitudinally and radially inwardly between adjacent ends of the optical lighting film sections 26a–c. The extractor elements 28 serve to scatter light rays reflected onto them, thereby causing the reflected rays to escape from the light guide 34 through the emitting area 30. With the extractor elements 28 extending radially inwardly, the extractor elements do not block any light from escaping, and consequently, light can be emitted from the entire 360° outer surface of the luminaire 20 when there is no back reflector. The extractor elements 28 can be formed integrally with the housing 22 or may be provided as separate components which can be slid into and/or out of the housing 22.

In general, either the radial dimension (i.e. height) or width of the extractor elements 28 varies as a function of the distance along the luminaire 20 in order to yield a light output which is reasonably uniform along the length of the luminaire 20, notwithstanding the fact that the amount of light inside the light guide 34 changes as a function of the distance along the luminaire 20. The extractor elements 28 need only be capable of scattering incident light and can include any diffuse white material which is preferably highly reflective. A suitable material is available from the Minnesota Mining and Manufacturing Company, St. Paul, Minn. under the trade designation SCOTCHCAL. The extractor material may optionally be provided on a support backing for added structural strength.

Figure 3:
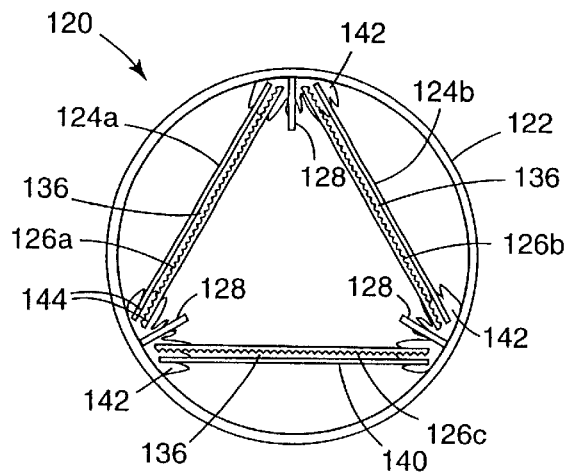
FIG. 3 is an end view of a second embodiment of the invention including joint members.

FIG. 3 shows a luminaire 120 similar to the one in FIG. 2 except the luminaire in FIG. 3 includes joint members 142, and the back reflector sections 124a, 124b and optical lighting film sections 126a–c are planar rather than arcuate. Features in FIG. 3 which are functionally similar to those of FIG. 2 are designated with like numerals incremented by 100. The joint members 142 can be separate parts or can be extruded integrally with the housing 122. The joint members 142 preferably include slots 144 adapted to slidably receive end portions of each back reflector 124a, 124b, end portions of each optical lighting film section 126a–c, and an end portion of each extractor element 128.

Since the back reflectors 124a, 124b and optical lighting film sections 126a–c are held in place by the joint members 142, there is no need for these items to be arcuate. In addition, since the back reflectors 124a, 124b, optical lighting film sections 126a–c, extractor elements 128, and emitting panel 140 are slidably connected with the housing 122 via the joint members 142, and since they are spaced from each other, each of these components can be individually slid into or out of the housing 122 easily without being damaged. In this way, assembly and repair of the luminaire are made easier, and design flexibility and customization are enhanced.

Figure 4:
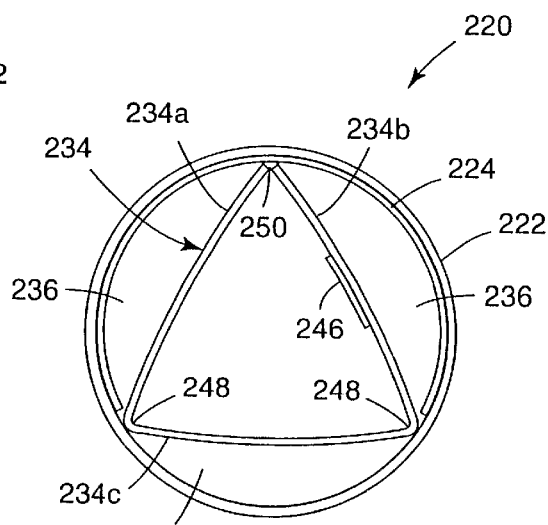
FIG. 4 is an end view of a third embodiment of the invention.

FIG. 4 shows another light guide luminaire 220. Features in FIG. 4 which are functionally similar to those of FIG. 2 are designated with like numerals incremented by 200. The luminaire 220 includes a longitudinal outer housing 222, a back reflector 224 secured along a portion of the inner surface of the housing 222, and longitudinally extending triangular light guide 234 arranged in spaced relation within the housing 222, thereby defining air gaps 236 between light guide 234 and the back reflector 224, and air gap 237 between the light guide 234 and the housing 222. The luminaire further includes a flat extractor element 246 secured to the inner surface of the light guide 234. The luminaire may optionally be constructed with the back reflector 224 secured to the outer surface of the housing 222. Such a construction, however, would result in lower efficiency since the light being reflected would have to pass through the housing 222 before being reflected back toward the light guide 234.

The light guide 234 is constructed from a single continuous sheet of optical lighting film including embossed lines of weakness which allow the sheet to be easily folded along straight lines, whereby the lines of weakness form two corners 248 of the triangular light guide 234, and the remote ends of the sheet form the third corner 250 of the light guide 234. The light guide 234 includes three sections 234a–c defined by the corners 248, 250 of the light guide. The light guide 234 is installed in the housing 222 by slightly compressing the light guide 234, thereby causing each sections 234a–c to bow outwardly slightly. The slightly compressed light guide 234 is then inserted into the housing 222 and allowed to expand outwardly into engagement with the back reflector 224, whereby the light guide is slidably retained in the housing 222. Alternatively, the light guide 234 may be formed of separate sections of optical lighting film as described in reference to FIGS. 2 and 3.

The patents, patent documents, and patent applications cited herein are incorporated by reference in their entirety as if each were individually incorporated by reference. While several embodiments of the present invention have now been described, it will be apparent to those of ordinary skill in the art that various changes and modifications may be made without deviating from the inventive concept set forth above. Thus, the scope of the present invention should not be limited to the structures described in this application, but only by the structures described by the language of the claims and the equivalents of those structures.

What is claimed is:

1. A light guide luminaire, comprising:
   (a) a longitudinal housing having a center and an inner surface; and
   (b) a light guide arranged within said housing, said light guide including at least two longitudinally extending sections of optical lighting film; wherein the shortest distance between said housing center and said housing inner surface is smaller than the radius of curvature of each section of optical lighting film.

2. A light guide luminaire as defined in claim 1, and further comprising at least one longitudinally extending extractor element arranged within said optical lighting film.

3. A light guide luminaire as defined in claim 2, wherein said extractor element extends radially inwardly from said housing between sections of optical lighting film.

4. A light guide luminaire as defined in claim 3, and further comprising at least one back reflector section arranged to reflect light back into said light guide.

5. A light guide luminaire as defined in claim 4, wherein said back reflector section is arranged between said housing and at least one of said sections of optical lighting film.

6. A light guide luminaire as defined in claim 5, wherein said back reflector section is secured to at least a portion of said inner surface of said housing.

7. A light guide luminaire as defined in claim 6, wherein said back reflector section is arranged in spaced relation between said housing inner surface and said optical lighting film.

8. A light guide luminaire as defined in claim 7, wherein each said section of optical lighting film, each extractor element, and each back reflector section is independently slidably retained in said housing.

9. A light guide luminaire as defined in claim 1, wherein said sections of optical lighting film are a single continuous sheet of optical lighting film.

10. A light guide luminaire as defined in claim 1, and further comprising a joint member adapted to slidably receive an end portion of at least one of said optical lighting film sections, said back reflector sections, or said extractor element.

11. A light guide luminaire as defined in claim 1, wherein said light guide is arranged in spaced relation within said housing to define an air gap between at least a portion of each said section of optical lighting film and said housing.

12. A light guide luminaire as defined in claim 11, wherein each said section of optical lighting film includes ends adjacent said housing inner surface, and each section of optical lighting film further includes an intermediate portion between said ends which is spaced from housing inner surface.

13. A light guide luminaire as defined in claim 1, wherein said housing has a circular cross-section, each said section of optical lighting film is arcuate, and said light guide includes at least three sections of optical lighting film.

14. A light guide luminaire as defined in claim 13, wherein each said section of optical lighting film has a radius of curvature of about two inches and said housing has a diameter of less than two inches.

15. A light guide luminaire as defined in claim 14, wherein said optical lighting film is formed of polycarbonate.

16. A light guide luminaire as defined in claim 15, and further comprising an emitting panel arranged between at least one section of optical lighting film and said housing, said emitting panel including at least one of color, graphical information, and printed information.

17. A light guide luminaire as defined in claim 1, wherein said housing has a circular cross-section and each said section of optical lighting film is planar.

* * * * *